(12) United States Patent
Kimball et al.

(10) Patent No.: US 6,704,031 B1
(45) Date of Patent: Mar. 9, 2004

(54) TOOLBAR TRACKING

(75) Inventors: Jeffrey Kimball, Great Falls, VA (US);
Joan Robins, Sterling, VA (US); David A Thistlethwaite, Alexandria, VA (US);
Larry L. Lu, Great Falls, VA (US);
Mark S. Prendergast, Ashburn, VA (US)

(73) Assignee: America Online, Inc., Dulles, VA (US)

( * ) Notice: Subject to any disclaimer, the term of this patent is extended or adjusted under 35 U.S.C. 154(b) by 388 days.

(21) Appl. No.: 09/603,586

(22) Filed: Jun. 26, 2000

Related U.S. Application Data
(60) Provisional application No. 60/195,990, filed on Apr. 7, 2000.

(51) Int. Cl.⁷ ................................................. G09G 5/00
(52) U.S. Cl. ....................... 345/745; 345/779; 345/835
(58) Field of Search ............................... 345/700, 733, 345/736, 738, 744, 745, 764, 765, 779, 810, 811, 825, 826, 835, 840, 841, 843, 854, 866; 709/201, 203, 204, 217, 219, 223, 224; 707/1, 10

(56) References Cited

U.S. PATENT DOCUMENTS

| | | |
|---|---|---|
| 5,533,110 A | 7/1996 | Pinard et al. |
| 5,774,670 A | 6/1998 | Montulli .................... 709/227 |
| 5,793,365 A | 8/1998 | Tang et al. ................. 345/758 |
| 5,878,219 A | 3/1999 | Vance, Jr. et al. ......... 709/217 |
| 5,920,692 A | 7/1999 | Nguyen et al. ............ 709/204 |
| 5,951,643 A | 9/1999 | Shelton et al. ............ 709/227 |
| 5,954,798 A | 9/1999 | Shelton et al. ............ 709/224 |
| 6,026,429 A | 2/2000 | Jones et al. ................ 709/201 |
| 6,035,332 A * | 3/2000 | Ingrassia et al. .......... 709/224 |
| 6,057,836 A * | 5/2000 | Kavalam et al. .......... 345/779 |
| 6,072,486 A * | 6/2000 | Sheldon et al. ............ 345/835 |
| 6,133,915 A * | 10/2000 | Arcuri et al. .............. 345/779 |
| 6,232,972 B1 * | 5/2001 | Arcuri et al. .............. 345/815 |
| 6,366,298 B1 * | 4/2002 | Haitsuka et al. ........... 345/736 |
| 6,483,523 B1 * | 11/2002 | Feng .......................... 345/745 |
| 2002/0057299 A1 * | 5/2002 | Oren et al. ................. 345/825 |
| 2002/0063735 A1 * | 5/2002 | Tamir et al. ............... 345/745 |
| 2002/0093529 A1 * | 7/2002 | Daoud et al. .............. 345/745 |
| 2002/0174230 A1 * | 11/2002 | Gudorf et al. ............. 709/227 |

OTHER PUBLICATIONS

Alan Cohen, "Instant Messaging", Apr. 13, 1999, PC Magazine, PC Labs, 2 pages.

"AOL technology: turning complicated things into engaging services", 1996 Annual Report, 22 pages.

"AOL Instant Messenger Windows Beta Features", Jun. 24, 1999, 2 pages, AOL Instant Messenger All New Version 2.0, 2 pages, Jun. 24, 1999, What is AOL Instant Messanger, 3 pages, Jun. 24, 1999, Quick Tips for Getting Started, 5 pages, Jun. 24, 1999, Frequently Asked Questions AOL Instant Messenger, 6 pages, Jun. 24, 1999.

* cited by examiner

*Primary Examiner*—Sy D. Luu
(74) *Attorney, Agent, or Firm*—Fish & Richardson P.C.

(57) ABSTRACT

Systems and techniques for tracking a graphical user interface toolbar by establishing a connection to a client; receiving a token including a unique tracking number corresponding to a toolbar item function from the client; and registering use of the toolbar item function.

43 Claims, 12 Drawing Sheets

1100

| Time | Group | Top Group |
|---|---|---|
| 10:23:48 | 22221 - Mail Center: Click on DropDown Channel: US Toolbar | 22220 Mail Center |
| 10:23:51 | 22222 - Write Mail Channel: US Toolbar | 22220 Mail Center |

| Time | Group | Top Group |
|---|---|---|
| 10:30:46 | 11111 - My AOL: Click on DropDown Channel: US Toolbar | 11110 My AOL |
| 10:30:47 | 11112 - My AOL Channel: US Toolbar | 11110 My AOL |

*FIG. 13*

TOOLBAR TRACKING

This application claims the benefit of U.S. Provisional Application No. 60/195,990, filed Apr. 7, 2000.

TECHNICAL FIELD

The present invention relates generally to tracking client use of an online service. More particularly, the present invention relates to tracking the use of graphical user interface toolbar by an online service provider.

BACKGROUND

Online service providers are constantly offering new services and upgrading existing services to enhance their subscribers' online experience. Subscribers have virtually on-demand access to news, weather, financial, sports, and entertainment services as well as the ability to transmit electronic messages and to participate in online discussion groups. For example, subscribers of online service providers such as America Online or CompuServe may view and retrieve information on a wide variety of topics from repositories located throughout the world. A server may be maintained by the service provider or by a third party provider who makes information and services available through the network of computers that make up the online service.

Online service providers facilitate access to information and services by providing interactive UIs (User Interfaces) that help subscribers navigate to desired resources. UIs often take advantage of the graphics capabilities of a subscriber's computer and eliminate the need to type in text commands. Generally, a UI allows a subscriber to simply select screen objects such as icons, windows, and drop-down menus to execute particular commands or to link to certain locations. The design of a UI is very important to a subscribers' online experience. In particular, the icons, windows, and menus of a UI must be arranged to enable a subscriber to locate preferred information and services quickly and easily.

SUMMARY

In one general aspect, a graphical user interface toolbar is tracked by establishing a connection to a client; receiving a token including a unique tracking number corresponding to a toolbar item function from the client; and registering use of the toolbar item function.

Implementations may include registering a time stamp corresponding to selection of the toolbar item function; registering elapsed time between successive selections of different toolbar item functions; registering a user account corresponding to selection of the toolbar item function; generating toolbar utilization data; and modifying the graphical user interface toolbar based on the toolbar utilization data.

The toolbar utilization data may include frequency at which a particular toolbar item function was selected during a period of time; percentage of users utilizing a particular toolbar item function; and the number of different toolbar items utilized by a particular account.

The graphical user interface toolbar may include a menu bar, an icon bar, and/or a navigation bar. The menu bar may include multiple menu item buttons associated with a corresponding pull-down menu. The icon bar may include multiple icons configured to initiate a particular function associated with the icon. A navigation bar may include multiple navigation buttons, a text box, and/or one or more action buttons.

In another general aspect, a graphical user interface toolbar is tracked by presenting the graphical user interface tool bar on a client device of a user; establishing a connection to a host; receiving a command, at the client device, to initiate a toolbar item function; initiating the toolbar item function; and sending a token including a unique tracking number corresponding to the initiated toolbar item function to the host.

DESCRIPTION OF THE DRAWINGS

FIGS. 8–13 are illustrations of different graphical user interfaces.

DESCRIPTION

For illustrative purposes, FIGS. 1–6 describe a communications system for implementing techniques for tracking client use of a user interface toolbar by an online service provider. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
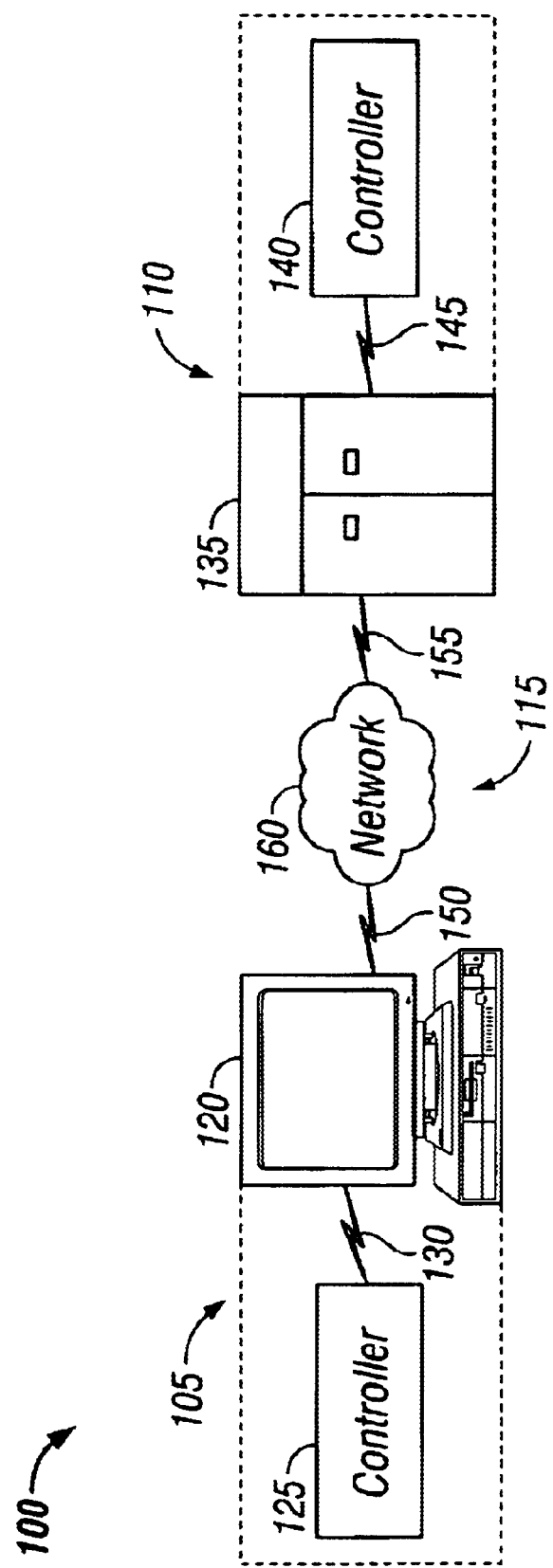
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125. For example, the client system 105 may include one or more general-purpose computers (e.g., personal computers), one or more special-purpose computers (e.g., devices specifically programmed to communicate with each other and/or the host system 110), or a combination of one or more general-purpose computers and one or more special-purpose computers. The client system 105 may be arranged to operate within or in concert with one or more other systems, such as for example, one or more LANs ("Local Area Networks") and/or one or more WANs ("Wide Area Networks").

The client device 120 is generally capable of executing instructions under the command of a client controller 125. The client device 120 is connected to the client controller 125 by a wired or wireless data pathway 130 capable of delivering data.

The client device 120 and client controller 125 each typically includes one or more hardware components and/or software components. An example of a client device 120 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of client controller 125 is a software application loaded on the client device 120 for commanding and directing communications enabled by the client device 120. Other examples include a program, a piece of code, an instruction, a device, a computer, a computer system, or a combination thereof, for independently or collectively instructing the client device 120 to interact and operate as described herein. The client controller 125 may be embodied permanently or temporarily in any type of machine, component, equipment, storage medium, or propagated signal capable of providing instructions to the client device 120.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, or xDSL), radio, television, cable, satellite, and/ or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

The host system 110 includes a host device 135 capable of executing instructions under the command and direction of a host controller 140. The host device 135 is connected to the host controller 140 by a wired or wireless data pathway 145 capable of carrying and delivering data.

The host system 110 typically includes one or more host devices 135 and/or host controllers 140. For example, the host system 110 may include one or more general-purpose computers (e.g., personal computers), one or more special-purpose computers (e.g., devices specifically programmed to communicate with each other and/or the client system 105), or a combination of one or more general-purpose computers and one or more special-purpose computers. The host system 110 may be arranged to operate within or in concert with one or more other systems, such as, for example, one or more LANs ("Local Area Networks") and/or one or more WANs ("Wide Area Networks").

The host device 135 and host controller 140 each typically includes one or more hardware components and/or software components. An example of a host device 135 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of host controller 140 is a software application loaded on the host device 135 for commanding and directing communications enabled by the host device 135. Other examples include a program, a piece of code, an instruction, a device, a computer, a computer system, or a combination thereof, for independently or collectively instructing the host device 135 to interact and operate as described herein. The host controller 140 may be embodied permanently or temporarily in any type of machine, component, equipment, storage medium, or propagated signal capable of providing instructions to the host device 135.

Figure 2:
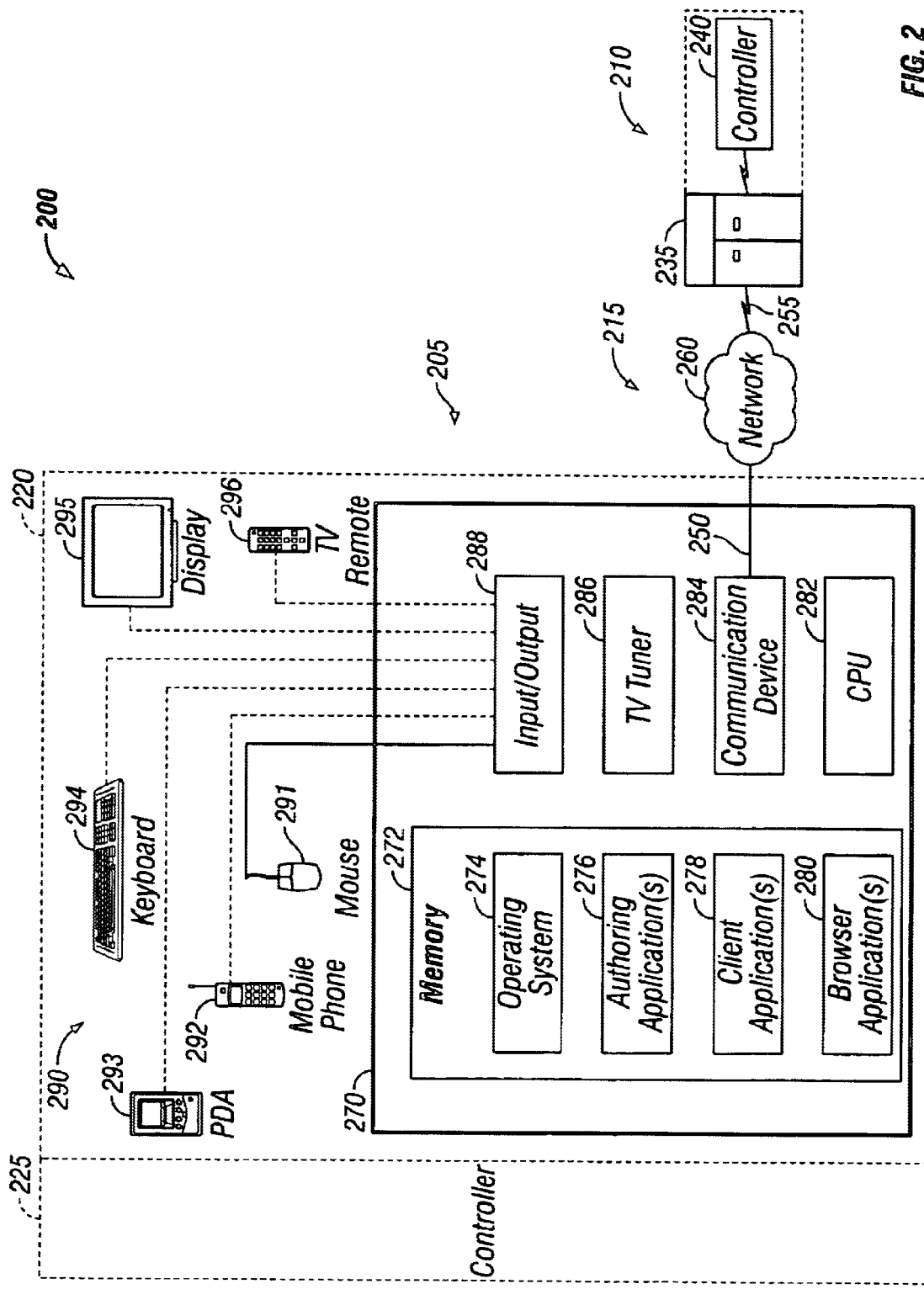
FIGS. 2–6 are expansions of aspects the block diagram of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible embodiment of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, and/or a TV remote control 296 for receiving information from and rendering information to subscribers.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
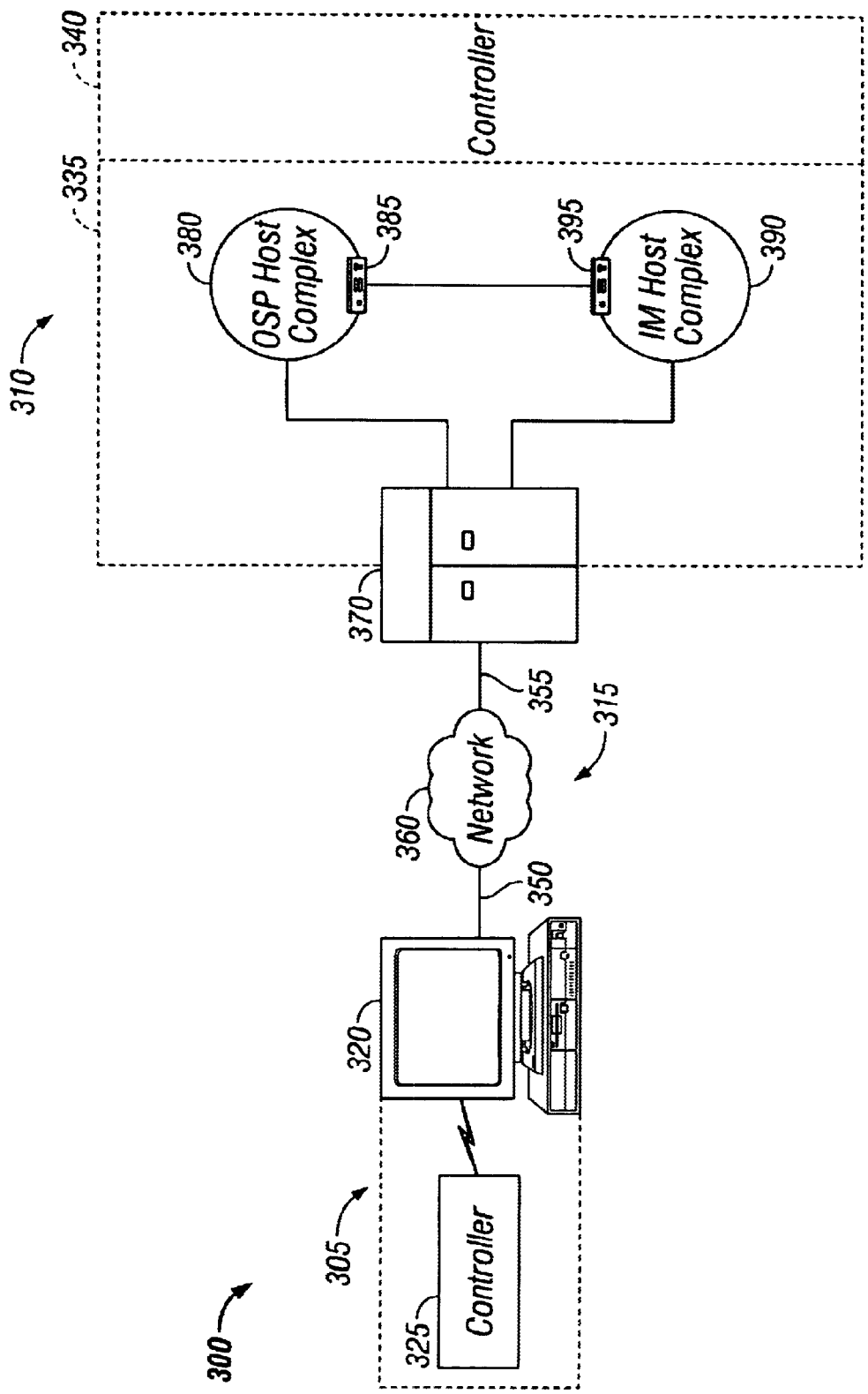

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible embodiment of the host systems 110 and 210 shown in FIGS. 1 and 2, respectively.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
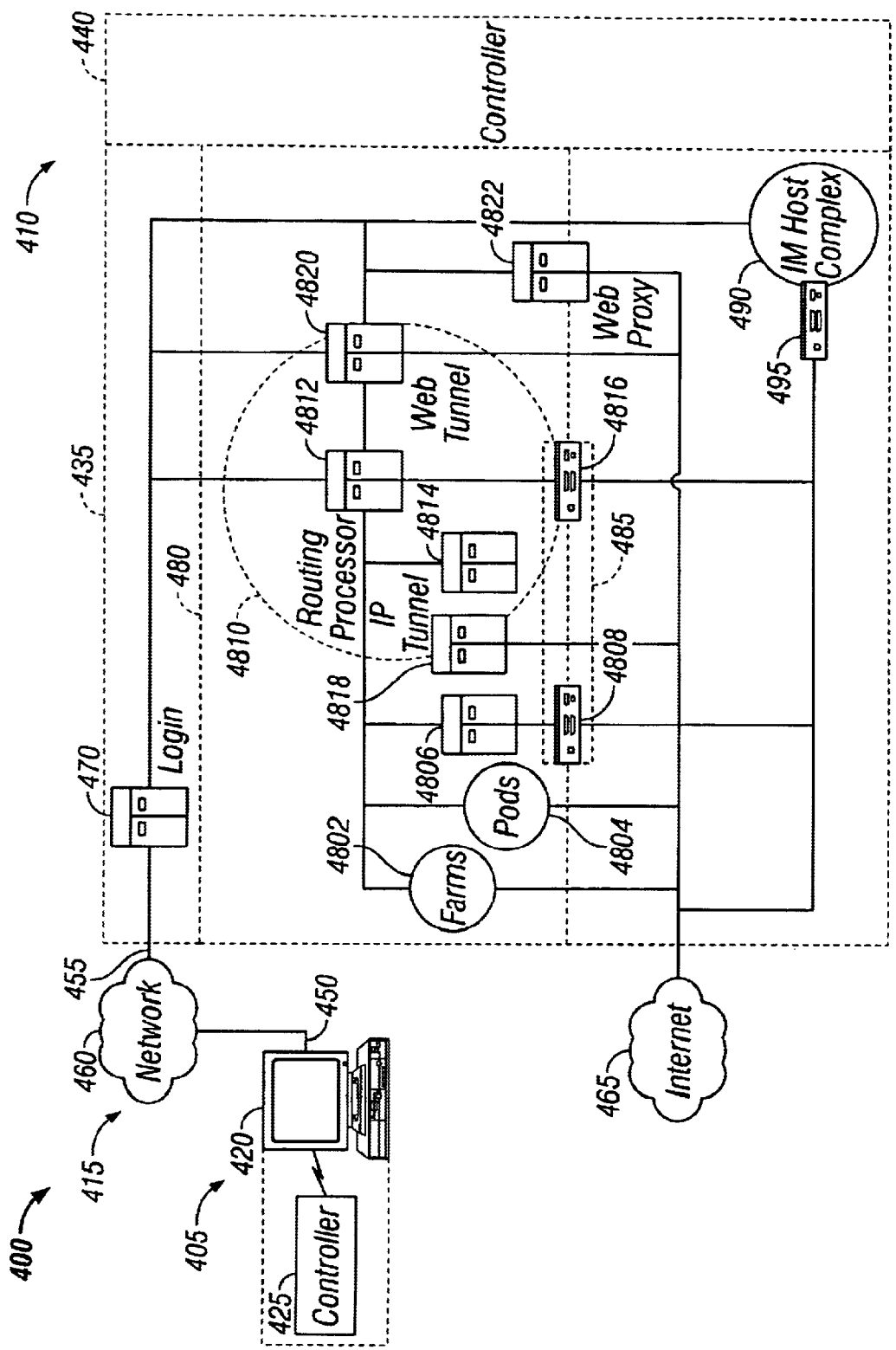

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communication system of FIG. 4 are broadly described above with respect to FIGS. 1–3. In particular, the client system 405 and the communications link 415 typically have attributes comparable to those described with respect to client systems 105, 205, and 305 and communications links 115, 215, and 315 of FIGS. 1–3. Likewise, the host system 410 of FIG. 4 may have attributes comparable to and illustrates one possible embodiment of the host systems 110, 210, and 310 shown in FIGS. 1–3, respectively. However, FIG. 4 describes an aspect of the host system 410, focusing primarily on one particular implementation of OSP host complex 480. For purposes of communicating with an OSP host complex 480, the delivery network 460 is generally a telephone network.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. However, in other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communication between the OSP host complex 480, the IM host complex 490, and the Internet 465.

The OSP host complex 480 supports a set of services from one or more servers located internal to and external from the OSP host complex 480. Severs external to the OSP host complex 480 generally may be viewed as existing on the Internet 465. Servers internal to the OSP complex 480 may be arranged in one or more configurations. For example, servers may be arranged in large centralized clusters known as farms 4802 or in localized clusters known as pods 4804.

Farms 4802 are groups of servers located at centralized locations within the OSP host complex 480. Farms 4802 generally are dedicated to providing particular functionality and services to subscribers and clients from a centralized location, regardless of the location of the subscriber or client. Farms 4802 are particularly useful for providing services that depend upon other processes and services for information, such as, for example, chat, email, instant messaging, news, newsgroups, search, stock updates, and weather. Thus, farms 4802 tend to rely on connections with external resources such as the Internet 465 and/or other servers within the OSP host complex 480.

To reduce the time delays and congestion inherent in centralized processing, some services offered by the OSP host complex 480 are provided from localized servers, generally known as pods 4804. Each pod 4804 includes one or more interrelated servers capable of operating together to provide one or more services offered by the OSP host complex 480 in a geographically localized manner, the servers within a pod 4804 generally operating independently rather than relying on resources external to the pod 4804 to operate. A pod 4804 may cache content received from external sources, such as farms 4802 or the Internet 465, making frequently requested information readily available to local subscribers served by the pod 4804. In this way, pods 4804 are particularly useful in providing services that are independent of other processes and servers such as, for example, routing, keywords, and downloading certain software and graphical interface updates with reduced processing time and congestion. The determination of which servers and processes are located in the pod 4804 is made by the OSP according to load distribution, frequency of requests, demographics, and other factors.

In addition to farms 4802 and pods 4804, the implementation of FIG. 4 also includes one or more non-podded servers 4806. In general, the non-podded server 4806 may be dedicated to performing a particular service that relies on other processes and services for information and may be directly or indirectly connected to resources outside of the OSP host complex 480, such as the Internet 465 and the IM host complex 490, through an OSP gateway 4808. In the event that subscriber usage of the particular service is relatively high, the non-podded server 4806 may be included in a farm.

In the implementation of FIG. 4, a pod 4810, shown in more detail, includes a routing processor 4812. In a packet-based implementation, the client system 405 may generate information requests, convert the requests into data packets, sequence the data packets, perform error checking and other packet-switching techniques, and transmit the data packets to the routing processor 4812. Upon receiving data packets from the client system 405, the routing processor 4812 may directly or indirectly route the data packets to a specified destination within or outside of the OSP host complex 480. In general, the routing processor 4812 will examine an address field of a data request, use a mapping table to determine the appropriate destination for the data request, and direct the data request to the appropriate destination.

For example, in the event that a data request from the client system 405 can be satisfied locally, the routing processor 4812 may direct the data request to a local server 4814 in the pod 4810. In the event that the data request cannot be satisfied locally, the routing processor 4812 may direct the data request internally to one or more farms 4802, one or more other pods 4804, or one or more non-podded servers 4806 in the OSP host complex 480 or may direct the data request externally to the Internet 465 or the IM host complex 490 through an OSP/pod gateway 4816.

The routing processor 4812 also may direct data requests and/or otherwise facilitate communication between the client system 405 and the Internet 465. In one implementation, the client system 405 uses an OSP client application to convert standard Internet content and protocols into OSP protocols and vice versa. For example, when a browser application transmits a request in standard Internet protocol, the OSP client application can intercept the request, convert the request into an OSP protocol and send the converted request to the routing processor 4812 in the OSP host complex 480. The routing processor 4812 recognizes the Internet 465 as the destination and routes the data packets to an IP ("Internet Protocol") tunnel 4818. The IP tunnel 4818 converts the data from the OSP protocol back into standard Internet protocol and transmits the data to the Internet 465. The IP tunnel 4818 also converts the data received from the Internet in the standard Internet protocol back into the OSP protocol and sends the data to the routing processor 4812 for delivery back to the client system 405. At the client system 405, the OSP client application converts the data in the OSP protocol back into standard Internet content for communication with the browser application.

The IP tunnel 4818 may act as a buffer between the client system 405 and the Internet 465, and may implement content filtering and time saving techniques. For example, the IP tunnel 4818 can check parental controls settings of the client system 405 and request and transmit content from the Internet 465 according to the parental control settings. In addition, the IP tunnel 4818 may include a number a caches for storing frequently accessed information. If requested data is determined to be stored in the caches, the IP tunnel 4818 may send the information to the client system 405 from the caches and avoid the need to access the Internet 465.

In another implementation, the client system 405 may use standard Internet protocols and formatting to access the pod 4810 and the Internet 465. For example, the subscriber can use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to a web tunnel 4820. The web tunnel 4820 may be a L2TP ("Layer Two Tunneling Protocol") tunnel capable of establishing a point-to-point protocol (PPP) session with the client system 405. The web tunnel 4820 provides a gateway to the routing processor 4812 within the pod 4810, the Internet 465, and a web proxy 4822.

The web proxy 4822 can look up subscriber information from the IP address of the client system 405 to determine the subscriber's parental controls settings and other demographic information. In this way, the web proxy 4822 can tailor the subscriber's content and user interfaces. The web proxy 4822 can also perform caching functions to store certain URLs ("Uniform Resource Locators") and other electronic content so that the web proxy 4822 can locally deliver information to the client system 405 and avoid the need to access the Internet 465 in the event that data requested by the client system 405 has been cached.

Figure 5:
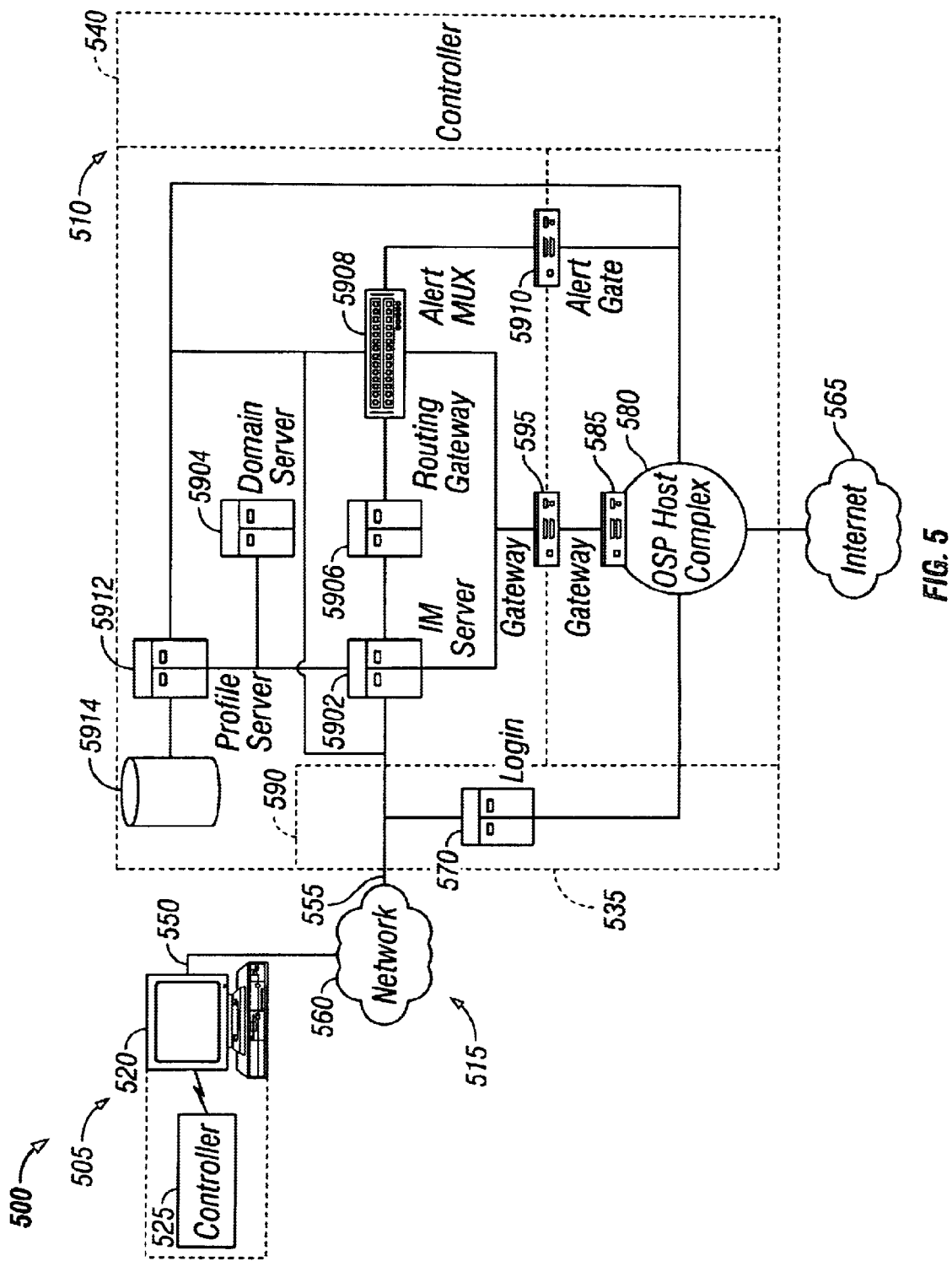

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communication system of FIG. 5 are broadly described above with respect to FIGS. 1–4. In particular, the client system 505 and the communications link 515 typically have attributes comparable to those described with respect to client systems 105, 205, 305, and 405 and communications links 115, 215, 315, and 415 of FIGS. 1–4. Likewise, the host system 510 of FIG. 5 may have attributes comparable to and illustrates one possible embodiment of the host systems 110, 210, 310, and 410 shown in FIGS. 1–4, respectively. However, FIG. 5 describes an aspect of the host system 510, focusing primarily on one particular implementation of IM host complex 590. For purposes of communicating with the IM host complex 590, the delivery network 560 is generally a telephone network.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain severs 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers to several alert multiplexors. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 590 to share subscriber profile data with other services. Alternatively, user profile data may be saved locally on the client device 505.

Figure 6:
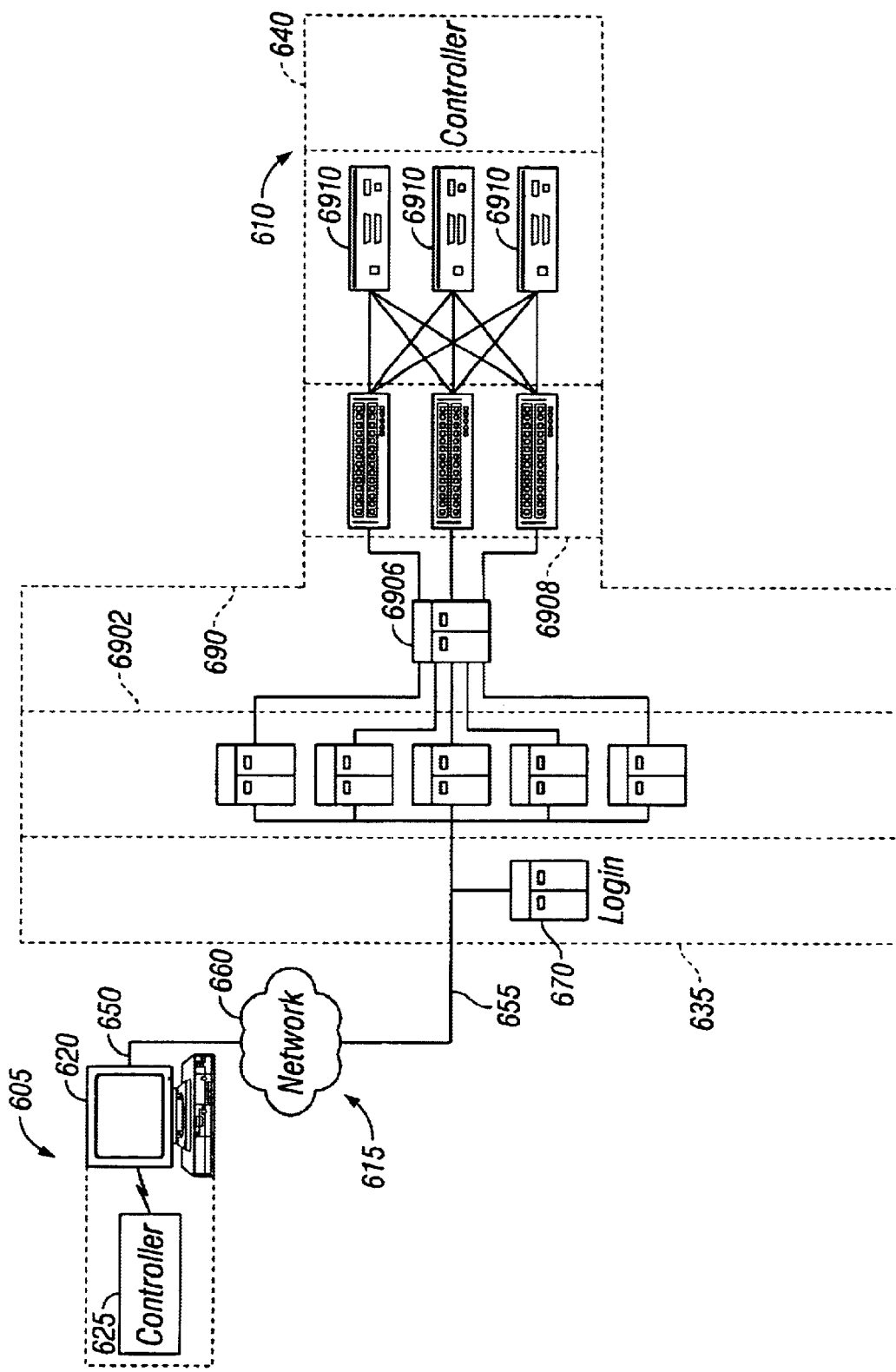

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communications link 615 may include communication pathways 650, 655 enabling communications through the one or more delivery networks 660.

Examples of each element within the communication system of FIG. 6 are broadly described above with respect to FIGS. 1–5. In particular, the client system 605 and the communications link 615 typically have attributes comparable to those described with respect to client systems 105, 205, 305, 405 and 505 and communications links 115, 215, 315, 415 and 515 of FIGS. 1–5. Likewise, the host system 610 of FIG. 6 may have attributes comparable to and illustrates one possible embodiment of the host systems 110, 210, 310, 410 and 510 shown in FIGS. 1–5, respectively. However, FIG. 6 describes an aspect of the host system 610, focusing primarily on one particular implementation of IM host complex 690. For purposes of communicating with the IM host complex 690, the delivery network 660 is generally a telephone network.

The client system 605 includes a client device 620 and a client controller 625. The client controller 625 is generally capable of establishing a connection to the host system 610, including the IM host complex 690. In one implementation, the client controller 625 includes an IM application for communicating with servers in the IM host complex 690 utilizing exclusive IM protocols.

The host system 610 includes a host device 635 and a host controller 640. The host controller 640 is generally capable of transmitting instructions to any or all of the elements of the host device 635. For example, in one implementation, the host controller 640 includes one or more software applications loaded on one or more elements of the host device 635. However, in other implementations, as described above, the host controller 640 may include any of several other programs, machines, and devices operating independently or collectively to control the host device 635.

The host system 610 includes a login server 670 capable of enabling communications with and authorizing access by client systems 605 to various elements of the host system 610, including the IM host complex 690. The IM host complex 690 includes an IM server network 6902 and an alert multiplexor network 6908. The IM server network 6902 is an interconnected network of IM servers and the alert multiplexor network 6908 is an interconnected network of alert multiplexors. Each IM server and each alert multiplexor can directly or indirectly communicate and exchange information with all of the IM servers in the IM server network 6902 and all of the alert multiplexors in the alert multiplexor network 6908. Each of the alert multiplexors in the alert multiplexor network 6908 is connected to several alert gates 6910 that receive different types of alerts. In the implementation of FIG. 6, the IM server network 6902 and the alert multiplexor network 6908 are interconnected by a routing gateway 6906 that serves as a common hub to reduce the number of connections.

A subscriber typically will be assigned to one IM server in the IM server network 6902 and to one alert multiplexor in the alert multiplexor network 6908 during a session based on one or more hashing techniques. However, the IM servers and the alert multiplexors are capable of storing subscriber information and other electronic content that may be accessed by the other IM servers and alert multiplexors. In one implementation, for example, each IM server in the IM server network 6902 may be dedicated to serving a particular set of registered subscribers. Because all of the IM servers can communicate with each other, all subscribers can communicate with each other through instant messaging. In another implementation, each alert multiplexor in the alert multiplexor network 6908 may be dedicated to storing information about a particular set or subset of alerts. Because all of the alert multiplexors can communicate with each other, all registered subscribers can receive all types of alerts. This networking arrangement enables the load to be distributed among the various servers in the IM host complex 690 while still enabling a subscriber to communicate, share information, or otherwise interact with other subscribers and servers in the IM host complex 690.

Figure 7:
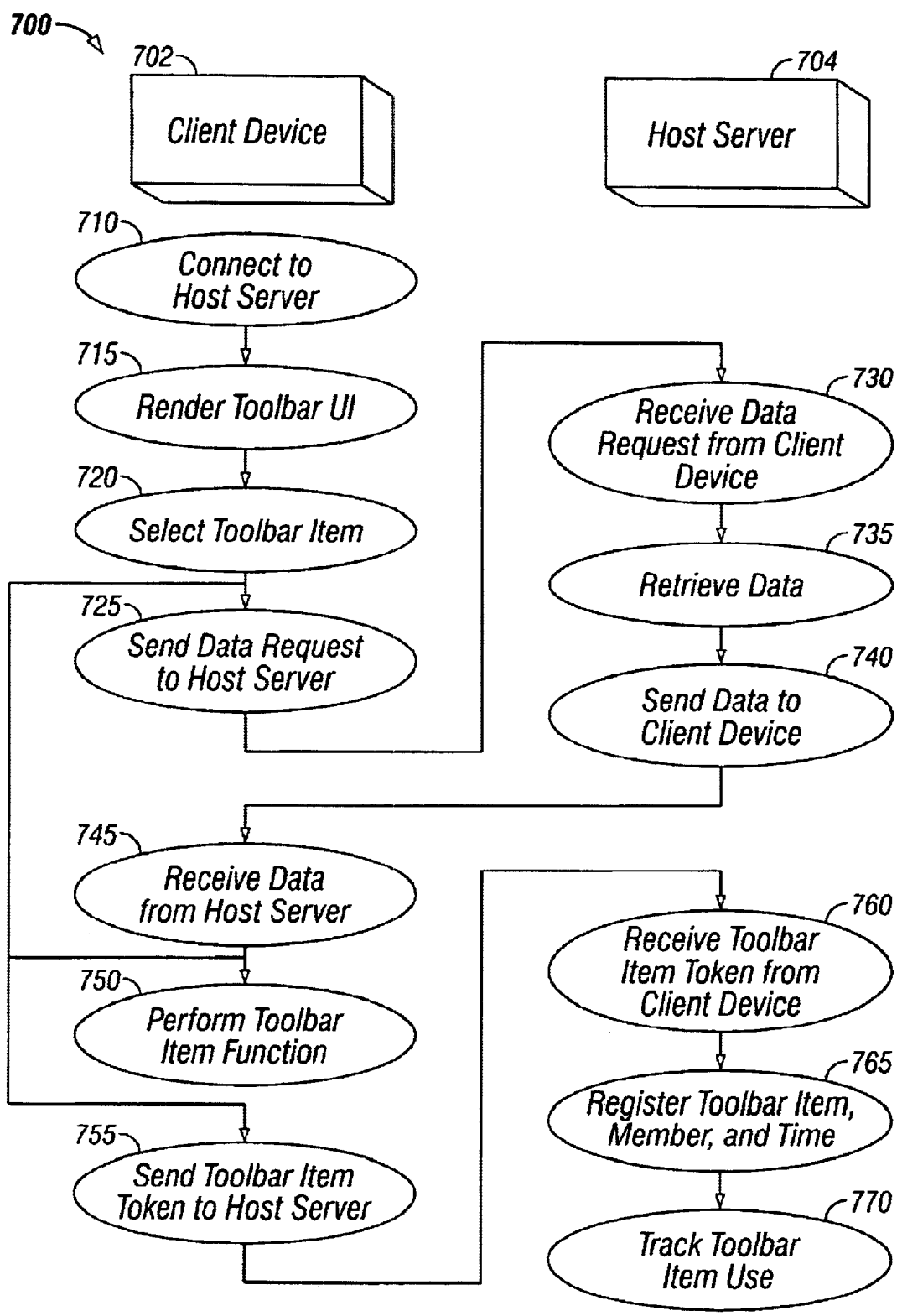
FIG. 7 is a flow chart of a communications method.

Referring to FIG. 7, a client device 702 and a host server 704 in the OSP host complex interact according to a procedure 700 to track toolbar use. The procedure 700 may be implemented by any type of hardware, software, device, computer, computer system, equipment, component, program, application, code, storage medium, or propagated signal. For example, in one implementation, the host server 704 is a podded terminal interface handler server in the OSP host complex. However, in other implementations, the host server 704 may be or may be included in any other element in the OSP host complex, the IM host complex, and/or the Internet.

Initially, a subscriber uses the client device 702 to connect to the host server 704 (step 710) and to render the toolbar UI (step 715). Typically, a connection to the host server 704 will be established after an authorization procedure. Once connected to the host server 704, the client device 702 may receive software updates and current data from the host server 704. In one implementation, the data required to render the toolbar UI is stored locally on the client device 702. In other implementations, however, the client device 702 may render the toolbar UI using the software updates and current data provided by the host server 704.

Using the client device 702, a subscriber can click on (i.e., select) an icon, drop down menu item, button, or other toolbar item on the toolbar UI associated with a desired function (step 720). Upon selection of the toolbar item, the client device 702 alone or in combination with the host server 704 performs the function associated with the toolbar item. Some functions are performed by the collective operation of the client device 702 and the host server 704. Typically, in this situation, the client device 702 sends a data request associated with the toolbar item to the host server 704 (step 725). Upon receiving the data request associated with the toolbar item from the client device 702 (step 730), the host server 704 retrieves the requested data needed to perform the function associated with the toolbar item (step 735), and sends the requested data to the client device 702 (step 740). Once the client device 702 receives the necessary data from the host server 704 (step 745), the client device 702 can perform the function associated with the toolbar item (step 750).

Other functions associated with the toolbar item, such as displaying a UI or drop-down menu from data stored locally on the client device 702, can be performed entirely by the client device 702. For these functions, steps 725–745 are bypassed.

In addition to performing the function associated with the toolbar item (step 750), the client device 702 sends a token/argument ("token") including a unique tracking number corresponding to the toolbar item to the host server 704 (step 755). The token may be sent at any time subsequent to or simultaneous with selection of the toolbar item (step 720) and may be separate from or included with any request, command, or data related to performing the function associated with the toolbar item.

The host server 704 receives the token from the client device 702 (step 760). The unique token indicates to the host server 704 that a toolbar item has been clicked and that toolbar tracking is to be performed. The token passes along the unique tracking number corresponding to the toolbar item to the host server 704. Because the token is unique for toolbar tracking and the tracking number is unique for each toolbar item function, the host server 704 can distinctly identify the command from the client device 702 to select a particular toolbar item. The host server 704 uses the unique tracking number to register the selection of the toolbar item function by a particular subscriber at a certain time (step 765). By repeating this process, the host server 704 can identify a subscriber's subsequent toolbar selections and the amount of time between selections. Based on this information, the host server 704 is able to track toolbar item use for the toolbar UI (step 770).

Figure 8:
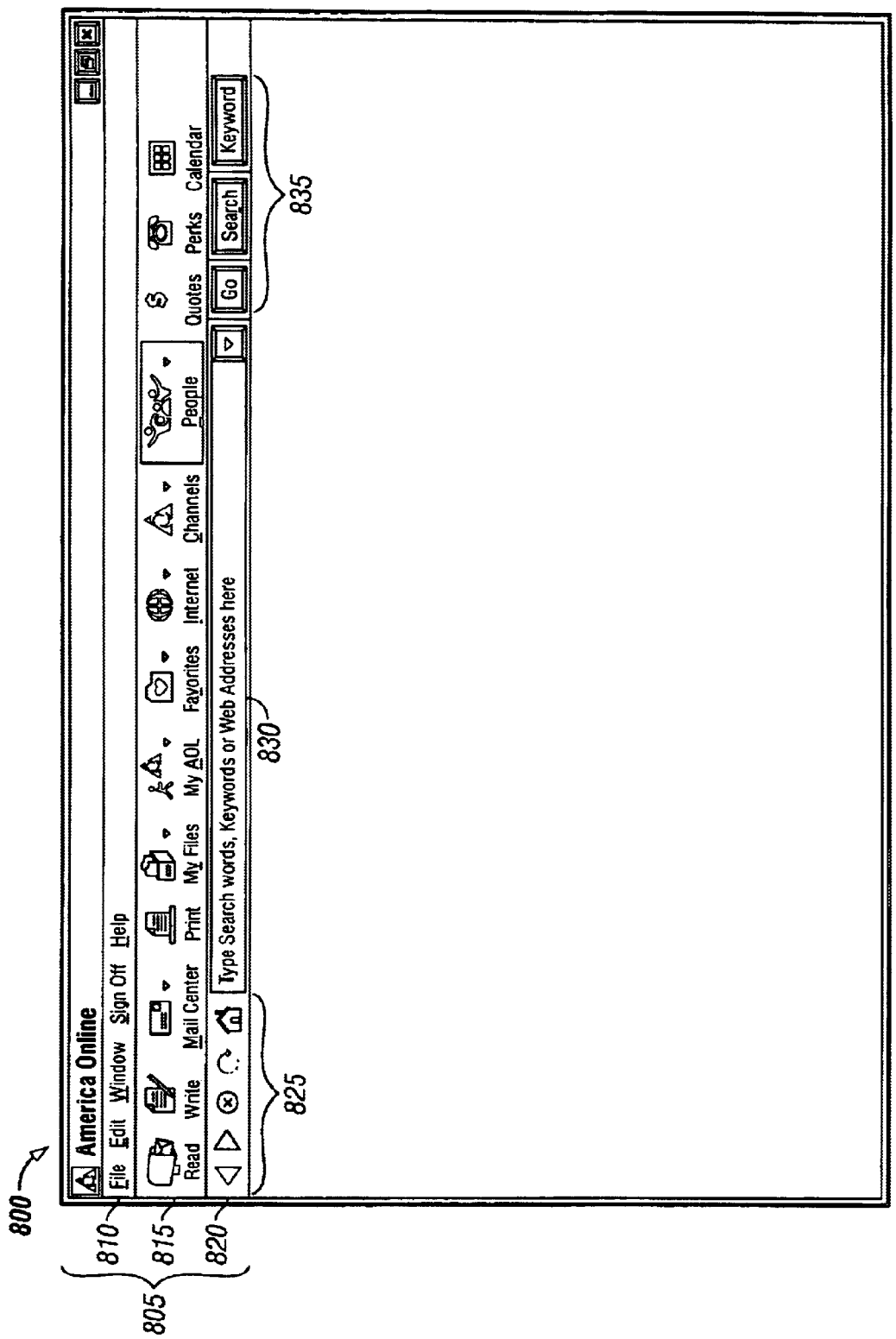

The procedure 700 described above may be implemented for any toolbar UI of any OSP, ISP and/or browser. FIG. 8 illustrates one example of a graphical UI that may be presented to a subscriber of America Online (AOL). In general, the graphical UI will be rendered on the subscriber's client device.

Referring to FIG. 8, a UI 800 includes a toolbar 805 for quickly using many features of the OSP, such as, for example, reading and writing email, entering chat areas with other subscribers, or accessing the Internet. The toolbar 805 includes, for example, a menu bar 810, an icon bar 815, and a navigation bar 820. A subscriber can find out the function of each item in the toolbar by positioning a pointer over the icon or button for a few seconds to display a help message. To use the function described in the help text, a subscriber clicks the icon or button.

A subscriber also may customize the toolbar 805 to include links to the subscriber's favorite online places. As the subscriber navigates to different areas of the online service and the Internet, the subscriber will be presented will different UIs. In general, however, the toolbar 805 will always be included in whatever UI is presented to the subscriber to allow constant access to the functions associated with the toolbar items.

The menu bar 810 includes one or more menu item buttons. Each menu item button is generally associated with a corresponding pull-down menu having options related to the menu item button. To display the pull-down menu associated with the menu item button, a subscriber clicks the menu item button. Alternatively, a subscriber can simultaneously press the ALT key and the underlined letter in the menu item button to display the drop-down menu. The drop-down menus may include one or more cascading menus depending on the options related to the menu item button.

A summary of the menu buttons shown in one implementation of the menu bar 810 is provided below. Of course, other implementations may include other menu buttons and different drop-down menu features.

The File menu button includes a drop-down menu for creating a new document, opening an existing document or downloaded file, opening a picture gallery, saving a document, or picture, setting printing options, printing documents, and pausing or exiting the online service. The Edit menu button includes a drop-down menu for undoing a previous function, cutting, copying, pasting, selecting, and finding content in a document, performing a spell check, and opening a dictionary or thesaurus. The Window menu button includes a drop-down menu for arranging windows and icons, closing windows, remembering the size and/or position of windows, and listing windows. The Sign Off menu button includes a drop-down menu for switching screen names and signing off of the online service. The Help menu button includes a drop-down menu for providing online or offline help, linking to frequently accessed areas such as, for example, parental controls help, keyword help, accounts and billing, and AOL access phone numbers, and identifying product features of the online service.

The icon bar 815 includes one or more icons. Selecting an icon may display a pop-up window or dialog box, may initiate a particular function, may directly link to an area of the online service or the Internet, or may display a pull-down menu having options related to the icon. To display the pull-down menu associated with the icon, a subscriber clicks the menu item button or simultaneously presses the ALT key and the underlined letter in the icon. The drop-down menus may include one or more cascading menus depending on the options related to the icon.

A summary of the icons shown in one implementation of the icon bar 815 is provided below. Of course, other implementations may include other items.

The Read icon looks like a mailbox and displays a subscriber's new e-mail. The Write icon looks like a pad and pencil and displays a blank e-mail form for creating and sending an e-mail message. The Mail Center icon looks like a letter, and includes a drop-down menu with options to interact with an address book, mail controls, and Auto AOL (e.g., offline mail options). The Print icon looks like paper in a printer and prints a current file or screen. The My Files icon looks like a file drawer and includes a drop-down menu that includes a subscriber's Personal Filing Cabinet, Download Manager and Web Page, if one has been created. The My AOL icon looks like person carrying an AOL triangle and includes a drop-down menu with preferences, Buddy Lists, and functions that allow a subscriber to customize AOL based on the subscriber's unique needs. The Favorites icon looks like a folder with a heart on it and saves all the Favorite Places a subscriber registers while exploring AOL and the Internet. The Internet icon looks like a globe and includes a drop-down menu that includes the Internet, the World Wide Web, FTP sites and Gopher, as well as the AOL Search tool. The Channels icon looks like an AOL logo and includes a drop-down menu listing each AOL Channel for easy access. The People icon looks like four people waving and presents a drop-down menu including online communication tools such as, for example, Chat, AOL Live, Buddy List®, Instant Message, and the AOL Member Directory.

The navigation bar 820 includes one or more navigation buttons 825, a text box 830, and one or more action buttons 835. The navigation bar 820 seamlessly integrates a browser application into the OSP client software. The navigation buttons work both within the OSP host complex and on the Internet. Whenever the navigation buttons are available to a subscriber, they are black; otherwise, the navigation buttons are grayed out. A subscriber can position a pointer over a navigation button for a few seconds to display help text explaining the purpose of the button.

A summary of the items shown in the navigation bar 820 is provided below. Of course, other implementations may include other items.

The Previous Button looks like a left facing arrow and takes a subscriber to the previous Web page or area in the OSP complex viewed during a session. The Next Button looks like a right-facing arrow and takes a subscriber to a particular page or area viewed before using the Previous button to backtrack. The Stop Button looks like a circled "x" and stops a selected page from downloading. The Refresh Button looks like a clockwise-pointing arrow and causes the browser to download the current page again. The Home Button looks like a house and links to a page set as the browser's home page. By default, this page may be linked to AOL's home page. The text box 825 is a dialog window and shows the keyword for the current AOL area or the URL of the current Web page. A subscriber may click on the small triangle button on the right side of the navigation bar to view a drop-down menu of areas or Web pages previously visited. The Go Button takes a subscriber immediately to the URL or keyword displayed in the text box 825. The Search Button brings up the interface to search AOL and the Web. The Keyword Button calls up the keyword screen, where a subscriber can type in any AOL Keyword or full Internet address.

A token is sent to the host server whenever any area accessible by the toolbar is selected. The token is sent regardless of how such areas are selected. For example, a token corresponding to reading e-mail is sent regardless of whether the Read icon in the icon bar 815 is clicked, the CTRL and the R keys are simultaneously pressed, or an item in the Mail Center drop-down menu is selected by clicking the item or simultaneously pressing ALT and an underlined letter in the label.

A summary of the areas accessible by the toolbar is shown below in Table 1. The items in bold text are primary headings correspond to icons and buttons on the toolbar. The items listed under the bold items are subheadings corresponding to drop-down or cascaded menu items associated with the icons and buttons on the toolbar. However, it should be noted that this table is given by way of illustration and only indicates one possible arrangement of areas contemplated to be within the spirit and scope of the present invention.

TABLE 1

| File | Read | Favorites |
|---|---|---|
| New |  | Favorite Places |
| Open | Write | Add Top Window to Favorite Places |
| Open Picture Gallery |  | Go to Keyword |

TABLE 1-continued

| | | |
|---|---|---|
| Save | | My Shortcuts |
| Save As | Mail Center | Edit Shortcuts |
| | | |
| Save to Personal Filing Cabinet | Read mail | What's New |
| Print Setup | Write Mail | AOL Store |
| Print | Old Mail | Sign on a Friend |
| Exit | Sent Mail | News |
| | Recently Deleted Mail | Stock Quotes |
| Edit | Address book | AOL Live |
| | | |
| | Mail Preferences | Internet |
| Undo | Mail Controls | Research & Learn |
| Cut | Mail Extras | Entertainment |
| Copy | Set up Automatic AOL | Shopping |
| Paste | Run Automatic AOL | |
| Select All | Read Offline Mail | |
| Find in Top Window | Incoming/Saved Mail | Internet |
| | | |
| Spell Check | Copies of Mail You've Sent | Internet Connection |
| Dictionary | Mail Waiting To Be Sent | Go to the Web |
| Thesaurus | | Search the Web |
| Capture Picture | | Visit AOL Hometown |
| | Print | AOL Instant Messenger |
| | | My News |
| Window | | Shortcuts |
| | | |
| Cascade | My Files | White Pages |
| | | |
| Tile | Personal Filing Cabinet | Yellow Pages |
| Arrange Icons | Save to Personal Filing Cabinet | Maps and Directions |
| Close All Except Front | Offline Mail | Newsgroups |
| Add Top Window To Favorite Places | Download Manager | FTP (File Transfer) |
| Remember Window Size Only | You've Got Pictures | |
| Remember Window Size and Position | Offline Newsgroups | |
| Forget Window Size and Position | Log Manager | Channels |
| | | |
| | | Computing |
| Sign Off | My AOL | Entertainment |
| | | |
| Switch Screen Name | My AOL | Families |
| Sign off | Preferences | Games |
| | AOL Access Numbers | Health |
| | My Member Profile | Interests |
| | Screen Names | International |
| Help | Passwords | Kids Only |
| | | |
| Member Services Online | Parental Controls | Local |
| Help | My Calendar | News |
| Offline Help | AOL Quick Checkout | Personal Finance |
| Parental Controls | Online Clock | Research & Learn |
| Help with keywords | Buddy List | Shopping |
| Accounts and Billing | My Web Page | Sports |
| AOL Access Phone Numbers | Stock Portfolios | Teens |
| About America Online | Reminder Service | Travel |
| | News Profiles | Women |
| | Interest Profiles | Workplace |
| People | | |
| | | |
| People Collection | | |
| Chat Now | Quotes | |
| Find a Chat | | |
| Start Your Own Chat | | |
| AOL Live | Perks | |
| Instant Message | | |
| View Buddy List | Calendar | |
| Send Message to Pager | | |
| Sign on a Friend | | |
| Visit AOL Hometown | Navigation | |
| | | |
| Search AOL Member Directory | Previous: Go Back | |
| Locate AOL Member Online | Next: Go Forward | |
| Get AOL Member Profile | Stop: Stop Loading | |
| Internet White Pages | Refresh | |
| | Home | |
| | Input box for Search Terms, Keywords and Web addresses | |
| | Go: Execute Input Box Command | |
| | Search: Search on Input Box Contents | |
| | Keyword | |

An example is provided below with reference to FIGS. 9–11. It should be understood that this example is given by way of illustration and only indicates one possible implementation.

Figure 9:
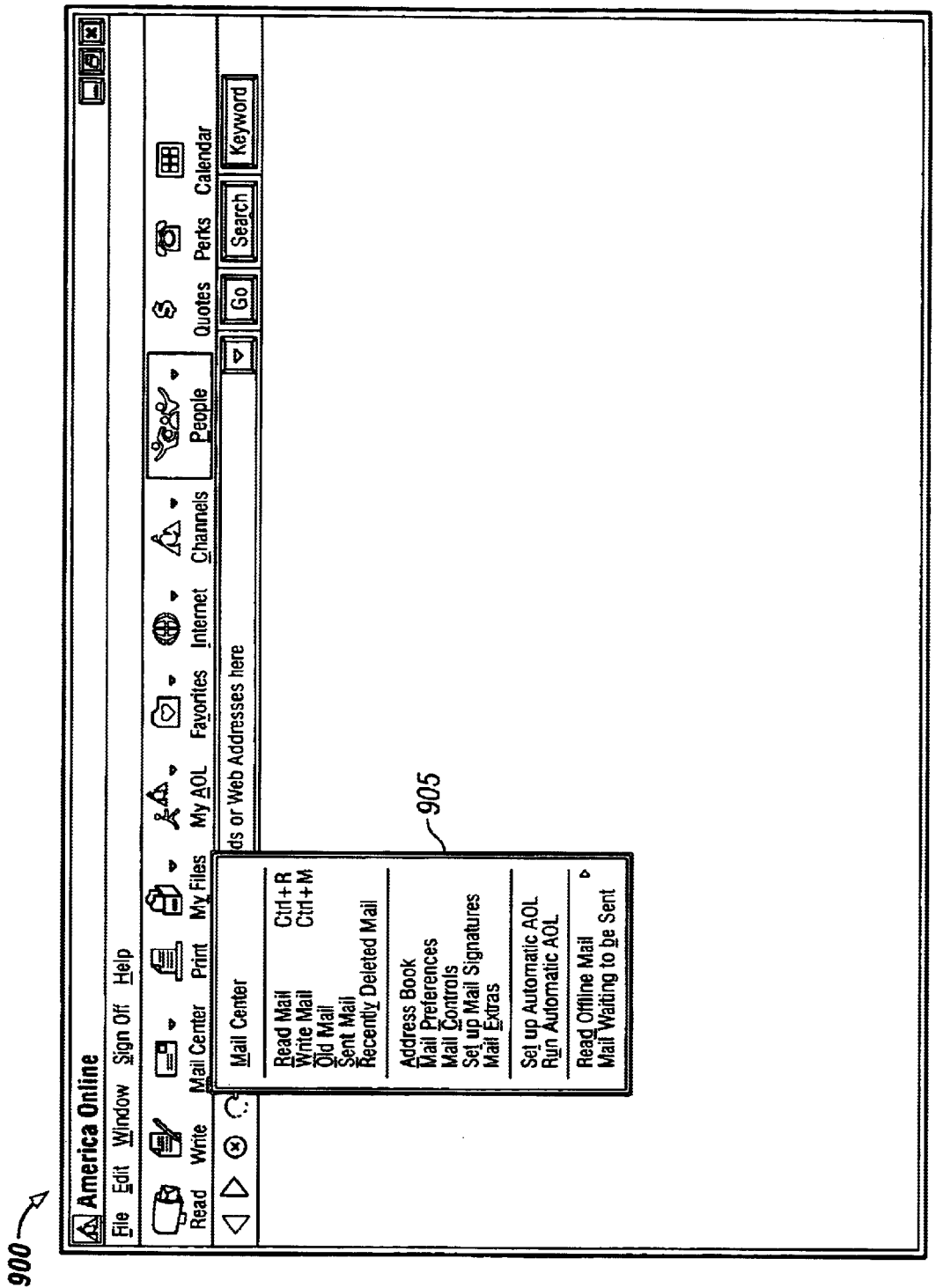

Referring to FIG. 9, a UI 900 includes a drop-down menu 905 displayed by selecting the Mail Center command. The Mail Center can be selected by simultaneously pressing the ALT key and the letter "M" or by simply clicking the Mail Center icon in the icon bar. Upon selection of the Mail Center command, the client device displays the drop-down menu 905 and also sends to the host server a token indicating that a toolbar item has been selected and the unique tracking number associated with the Mail Center command. In one implementation, a subscriber waits three seconds and then selects the Write Mail command. The Write Mail command can be selected by simultaneously pressing the ALT key and the letter "W" or by clicking the Write Mail menu item button in the drop-down menu 905.

Figure 10:
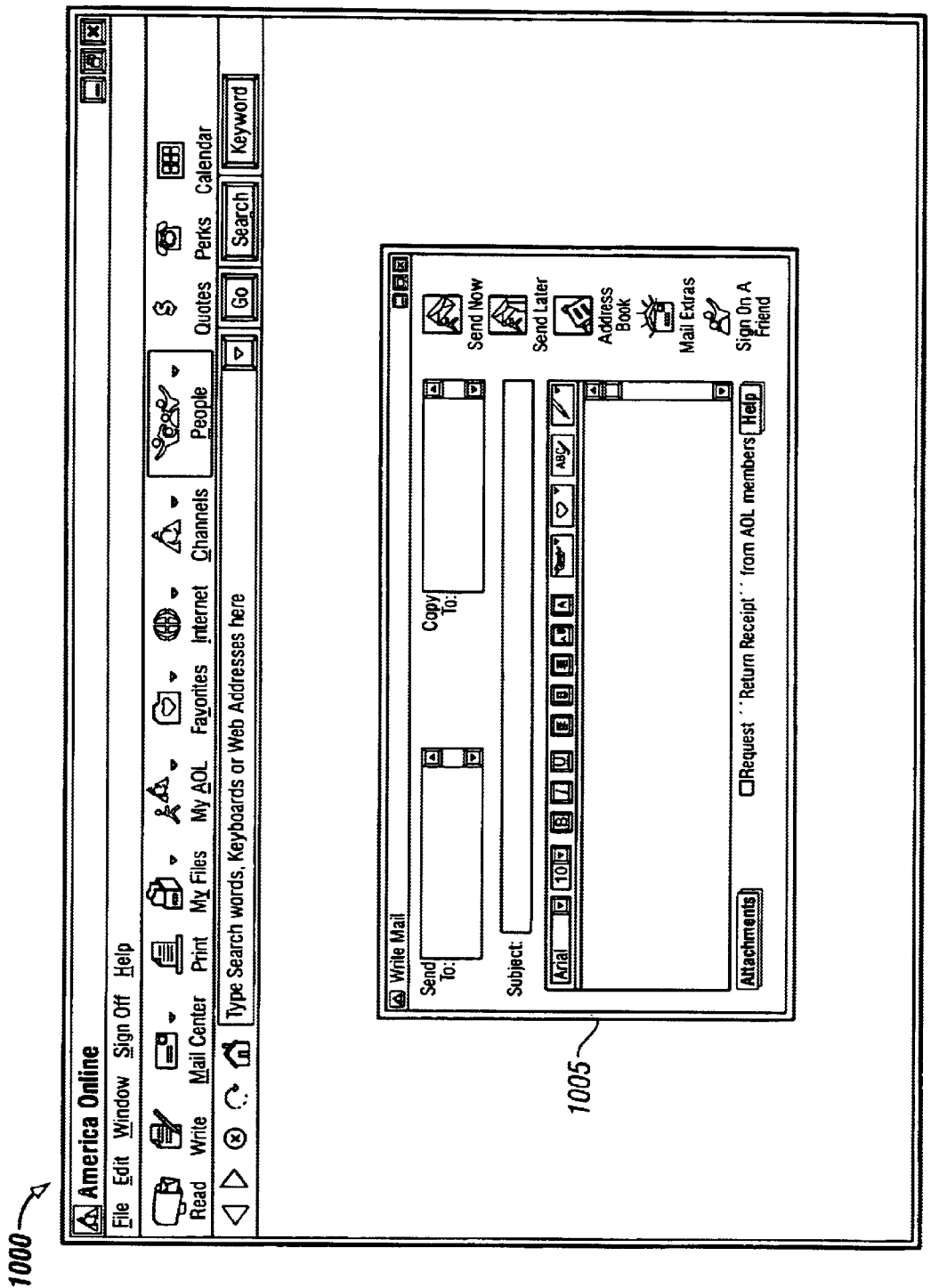
Figure 12:
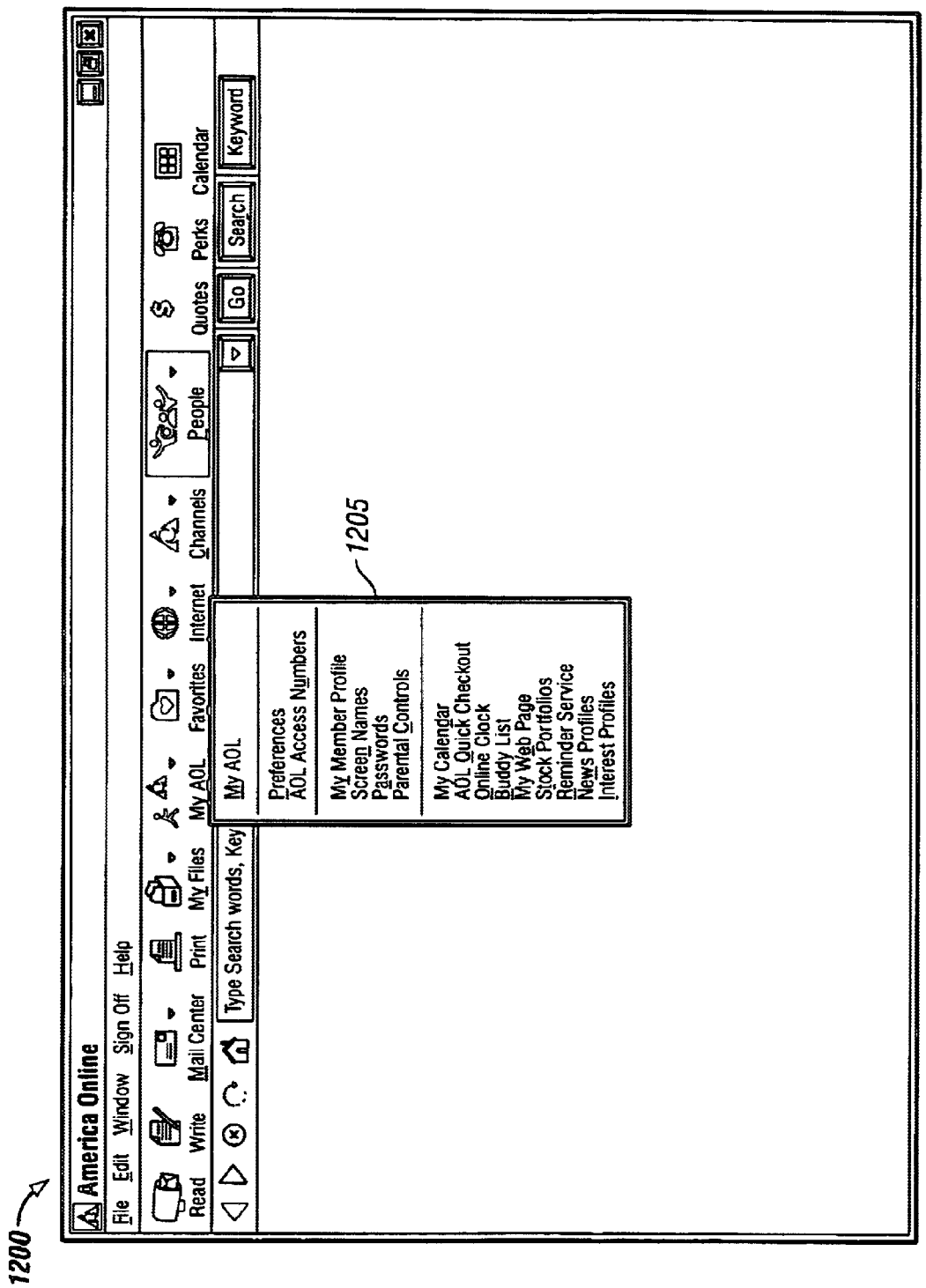

Referring to FIG. 10, a UI 1000 is displayed by selecting the Write Mail command. Upon selection of the Write Mail command, the client device displays a blank e-mail form 1005 and also sends to the host server a token indicating that a toolbar item has been selected and the unique tracking number associated with the Write Mail command.

Referring to FIG. 11, a UI 1100 displayed to a host administrator is illustrated. The UI 1100 shows the path associated with the selection of the Mail Center and Write Mail commands registered by the host server. With the host server registering the toolbar selections, as described above, toolbar utilization data can be generated. The toolbar utilization data can include, for example, the aggregate number of unique screen names and/or unique accounts that selected a particular toolbar item, the toolbar item selected the frequency at which toolbar items are used, and the amount of time spent with each toolbar item. Such toolbar utilization data can be used to track individual and overall client use of toolbar items.

Other aspects, embodiments are within the scope of the following claims.

What is claimed is:

1. A method for tracking use of a graphical user interface toolbar, the method comprising:
    establishing a connection to a client;
    receiving from the client over the established connection a unique tracking number corresponding to a toolbar item function that has been manipulated; and
    registering use of the toolbar item function based on the unique tracking number corresponding to the toolbar item function that has been manipulated.

2. The method of claim 1, further comprising registering a time stamp corresponding to selection of the toolbar item function.

3. The method of claim 2, further comprising registering elapsed time between successive selections of different toolbar item functions by way of successive time stamps.

4. The method of claim 1, further comprising registering a user account corresponding to selection of the toolbar item function.

5. The method of claim 1, further comprising generating toolbar utilization data.

6. The method of claim 5, further comprising modifying the graphical user interface toolbar based on an aggregation of the toolbar utilization data.

7. The method of claim 5, wherein the toolbar utilization data includes frequency at which a particular toolbar item function was selected during a period of time.

8. The method of claim 5, wherein the toolbar utilization data includes percentage of users utilizing a particular toolbar item function.

9. The method of claim 1, wherein the graphical user interface toolbar comprises any combination of menu bars, icon bars, and navigation bars.

10. The method of claim 9, wherein at least one menu bar comprises multiple menu item buttons, each menu item button associated with a corresponding pull-down menu.

11. The method of claim 9, wherein at least one icon bar includes multiple icons, each icon configured to initiate a particular function associated with the icon.

12. The method of claim 11, wherein the function associated with the icon is one of a direct action and a call to invoke a drop-down menu.

13. The method of claim 9, wherein at least one navigation bar comprises one or more of a navigation button, an input box, and an action button.

14. A computer program, stored on a computer readable medium, for tracking use of a graphical user interface toolbar, the computer program comprising instructions for:
    establishing a connection to a client;
    receiving from the client over the established connection a unique tracking number corresponding to a toolbar item function that has been manipulated; and
    registering use of the toolbar item function based on the unique tracking number corresponding to the toolbar item function that has been manipulated.

15. The computer program of claim 14, the computer readable medium comprising a disc.

16. The computer program of claim 14, the computer readable medium comprising a client device.

17. The computer program of claim 14, the computer readable medium comprising a host device.

18. A toolbar tracking apparatus, comprising a host configured to:
    establish a connection to a client;
    receive from the client over the established connection a token including a unique tracking number corresponding to a toolbar item function that has been manipulated; and
    register use of the toolbar item function based on the unique tracking number corresponding to the toolbar item function that has been manipulated.

19. A method for tracking use of graphical user interface toolbar, comprising:
    presenting the graphical user interface toolbar on a client device of a user;
    establishing a connection between the client device and a host;
    receiving a command, at the client device, to initiate a toolbar item function;
    initiating the toolbar item function responsive to the command; and
    sending a unique tracking number corresponding to the initiated toolbar item function to the host over the established connection.

20. A computer program, stored on a computer readable medium, for tracking use of a graphical user interface toolbar, the computer program comprising instructions for:
    presenting the graphical user interface toolbar on a client device of a user;
    establishing a connection between the client device and a host;
    receiving a command, at the client device, to initiate a toolbar item function;

initiating the toolbar item function responsive to the command; and sending a unique tracking number corresponding to the initiated toolbar item function to the host over the established connection.

21. The computer program of claim 20, the computer readable medium comprising a disc.

22. The computer program of claim 20, the computer readable medium comprising a client device.

23. The computer program of claim 20, the computer readable medium comprising a host device.

24. The computer program of claim 14, further comprising instructions for registering a user account corresponding to selection of the toolbar item function.

25. The computer program of claim 14, further comprising instructions for generating toolbar utilization data.

26. The computer program of claim 25, further comprising instructions for modifying the graphical user interface toolbar based on an aggregation of the toolbar utilization data.

27. The computer program of claim 25, wherein the toolbar utilization data includes a frequency at which a particular toolbar item function was selected during a period of time.

28. The computer program of claim 25, wherein the toolbar utilization data includes a percentage of users utilizing a particular toolbar item function.

29. The apparatus of claim 18, further comprising a host configured to register a user account corresponding to selection of the toolbar item function.

30. The apparatus of claim 18, further comprising a host configured to generate toolbar utilization data.

31. The apparatus of claim 30, further comprising a host configured to modify the graphical user interface toolbar based on an aggregation of the toolbar utilization data.

32. The apparatus of claim 30, wherein the toolbar utilization data includes a frequency at which a particular toolbar item function was selected during a period of time.

33. The apparatus of claim 30, wherein the toolbar utilization data includes a percentage of users utilizing a particular toolbar item function.

34. The method of claim 19, further comprising registering a user account corresponding to selection of the toolbar item function.

35. The method of claim 19, further comprising generating toolbar utilization data.

36. The method of claim 35, further comprising modifying the graphical user interface toolbar based on an aggregation of the toolbar utilization data.

37. The method of claim 35, wherein the toolbar utilization data includes a frequency at which a particular toolbar item function was selected during a period of time.

38. The method of claim 35, wherein the toolbar utilization data includes a percentage of users utilizing a particular toolbar item function.

39. The computer program of claim 20, further comprising instructions for registering a user account corresponding to selection of the toolbar item function.

40. The computer program of claim 20, further comprising instructions for generating toolbar utilization data.

41. The computer program of claim 40, further comprising instructions for modifying the graphical user interface toolbar based on an aggregation of the toolbar utilization data.

42. The computer program of claim 40, wherein the toolbar utilization data includes a frequency at which a particular toolbar item function was selected during a period of time.

43. The computer program of claim 40, wherein the toolbar utilization data includes a percentage of users utilizing a particular toolbar item function.

* * * * *